A. KEMPENNER.
Plastic Composition for the Manufacture of Aquarium Frames, &c.
No. 210,204. Patented Nov. 26, 1878.
Fig: 1.
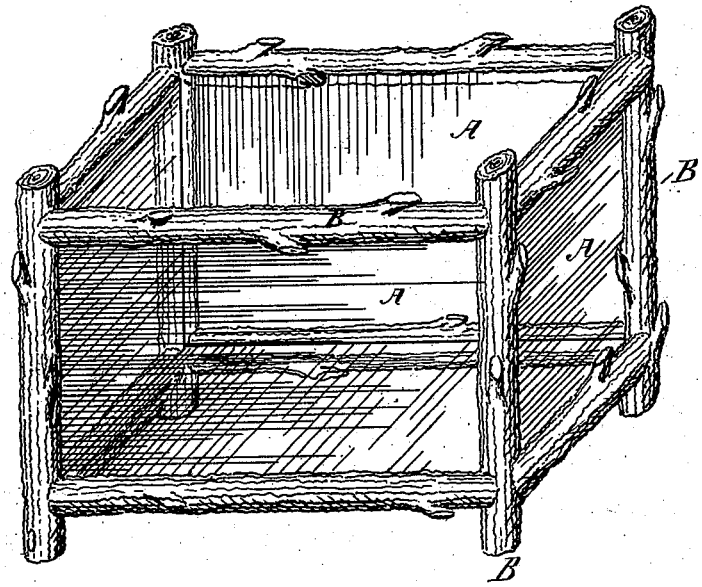
Fig: 2.
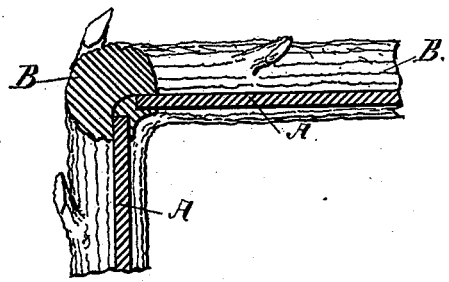

UNITED STATES PATENT OFFICE.

ADOLPHE KEMPENNER, OF CHICAGO, ILLINOIS.

IMPROVEMENT IN PLASTIC COMPOSITIONS FOR THE MANUFACTURE OF AQUARIUM-FRAMES, &c.

Specification forming part of Letters Patent No. 210,204, dated November 26, 1878; application filed October 8, 1878.

*To all whom it may concern:*

Be it known that I, ADOLPHE KEMPENNER, of Chicago, in the county of Cook and State of Illinois, have invented a new and Improved Compound and Process for the Manufacture of Aquarium-Frames, which improvement is fully set forth in the following specification, reference being had to the accompanying drawings.

The nature of my invention relates to the manufacture of aquariums; and it consists in the material and process for forming the aquarium-frames.

The compound I use consists of sharp sand ten parts, fire-clay five parts, coal-tar two parts, and asphaltum one part. The coal-tar and asphaltum I melt over a slow fire, and mix them thoroughly, after which I add the fire-clay and sand, previously mixed and heated, and stir and agitate the whole until it becomes a putty-like plastic dough, which while yet warm can be worked into any shape, but becomes hard with cooling. This material is perfectly water-proof, and unites great hardness with strength, and therefore is well adapted for making the glass-plate joints and forming an ornamental frame-work to the aquarium.

In the drawings, Figure 1 represents a perspective view of an aquarium the frame-work of which is formed of the compound, and in the manner above-described; and Fig. 2 represents a section through one corner of the same.

A A are the glass plates, and B is the frame shaped in imitation of rustic wood-work, and painted accordingly; but other designs may be formed in a similar manner, either by free hand-work or by pressing in proper molds.

What I claim as my invention is—

The compound herein described, consisting of a mixture of sand, fire-clay, coal-tar, and asphaltum, for forming the frames of aquariums by the process substantially herein set forth.

ADOLPHE KEMPENNER.

Witnesses:
EMIL H. FROMMANN,
S. V. KEMPENNER.